(12) United States Patent
Takeda et al.

(10) Patent No.: US 6,586,567 B2
(45) Date of Patent: Jul. 1, 2003

(54) PRODUCTION PROCESS OF POLYPHENYLENE ETHER

(75) Inventors: Yuji Takeda, Mie (JP); Akio Hasebe, Mie (JP); Isamu Masumoto, Mie (JP); Akira Mitsui, Chiba (JP)

(73) Assignees: Mitsubishi Gas Chemical Company Inc., Tokyo (JP); Asahi Kasei Kabushiki Kaisha, Osaka (JP)

(*) Notice: Subject to any disclaimer, the term of this patent is extended or adjusted under 35 U.S.C. 154(b) by 35 days.

(21) Appl. No.: 09/883,277

(22) Filed: Jun. 19, 2001

(65) Prior Publication Data

US 2002/0040126 A1 Apr. 4, 2002

(30) Foreign Application Priority Data

Jun. 19, 2000 (JP) .................................. 2000-182500

(51) Int. Cl.[7] .................. C08G 65/38; C08G 65/40; C08G 65/42
(52) U.S. Cl. .................. 528/501; 528/86; 528/491; 528/495; 528/497; 528/499; 528/500; 528/502 R; 528/503
(58) Field of Search .................... 528/501, 86, 491, 528/495, 497, 499, 502 R, 503, 500

(56) References Cited

U.S. PATENT DOCUMENTS

| 4,058,504 A | 11/1977 | Yonemitsu et al. |
| 4,536,567 A | 8/1985 | Hambrecht et al. |
| 5,214,128 A | 5/1993 | Horiguchi et al. |

OTHER PUBLICATIONS

Japanese Abstract of JP03–181423, XP–002189590, Aug. 7, 1991.

Primary Examiner—Duc Truong

(57) ABSTRACT

A process for producing a polyphenylene ether, which comprises contacting, with an aqueous solution of a chelating agent, a polyphenylene ether solution and adding a water-soluble poor solvent for the polyphenylene ether to precipitate the polyphenylene ether; and recovering the thus precipitated polyphenylene ether. A mixture remaining after the recovery of the polyphenylene ether is brought into contact with water to extract the water-soluble poor solvent, and a water phase containing the thus extracted water-soluble poor solvent is recovered by separation. The water-soluble poor solvent is separated and removed from the water phase by distillation, and the whole or a part of the remaining water phase is recycled as water to be brought into contact with the mixture, the remaining water phase having a content of a high-boiling-point organic substance of 1 wt. % or less.

13 Claims, No Drawings

PRODUCTION PROCESS OF POLYPHENYLENE ETHER

FIELD OF THE INVENTION

The present invention relates to a production process of a polyphenylene ether. More specifically, the invention pertains to a production process of a polyphenylene ether, wherein water used in the polymerization-solvent-recovery step is recycled to reduce the discharged amount of water.

BACKGROUND OF THE INVENTION

A polyphenylene ether is available by polymerizing a phenol compound in an aromatic solvent or a mixture of an aromatic solvent and a nonsolvent in the presence of oxygen by using an oxidative coupling polymerization catalyst containing copper, manganese or cobalt. After termination of the polymerization reaction and removal of the catalyst, the polyphenylene ether solution thus obtained is charged in a poor solvent for a polyphenylene ether and solidified. The polyphenylene ether thus solidified is, after solid-liquid separation, fed to a drying step, whereby polyphenylene ether powders are prepared. The filtrate of the mixture of the polymerization solvent and poor solvent after solid-liquid separation is, on the other hand, fed to the recovery step. When components cannot be separated easily by distillation owing to azeotropy of the poor solvent with the polymerization solvent, and at the same time the polymerization solvent is non-water-soluble but the poor solvent is water-soluble, the filtrate is brought into contact with water to extract the poor solvent in the water phase, thus separating it from the polymerization catalyst and then, the water phase is separated into the poor solvent and water by distillation.

Water thus separated however still contains a large amount of high-boiling point organic substances, particularly diphenohydroquinone or diphenoquinone so that it cannot be recycled freely because there is a danger of it causing problems such as clogging of the pipe. At present, it is therefore the common practice to drain such water after treated with active sludge or incineration. Incineration of water however requires an enormous energy, while treatment with active sludge needs cumbersome sludge management. Thus, a technique for improving the solvent recovery step by using water has not been found yet.

SUMMARY OF THE INVENTION

The present invention was made to solve the above-described problems.

Accordingly, an object of the present invention is to provide a production process of a polyphenylene ether giving a reduced amount of water to be discharged.

Other objects and effects of the present invention will become apparent from the following description.

The present inventors carried out an extensive investigation. As a result, they found a method permitting—by bringing a mixture, which has been left after the recovery of a solidified polyphenylene ether and contains a non-water-soluble polymerization solvent and a water-soluble poor solvent, into contact with water, extracting the water-soluble poor solvent in the water phase, and distilling the water phase to separate and remove the poor solvent—recycled use of a whole or part of the water phase thus obtained. The present invention is based on this finding.

In the invention, there is thus provided a production process of a polyphenylene ether wherein water used in the polymerization-solvent-recovery step is recycled to reduce the discharged amount of water. The problem of clogging of a pipe or the like which has so far prevented the recycled use of water is solved by bringing the polyphenylene ether solution into contact with an aqueous solution of a chelating agent while maintaining the temperature at 50 to 120° C. for 10 to 180 minutes.

That is, the above-described objects of the present invention have been achieved by providing the following production processes.

1) A process for producing a polyphenylene ether, which comprises:

contacting, with an aqueous solution of a chelating agent, a polyphenylene ether solution obtained by polymerization in a non-water-soluble polymerization solvent for a polyphenylene ether in the presence of a catalyst, to terminate the polymerization and deactivating the catalyst; and adding a water-soluble poor solvent for the polyphenylene ether to precipitate the polyphenylene ether; and recovering the thus precipitated polyphenylene ether, wherein (a) the contact with the chelating agent aqueous solution is carried out by holding the polyphenylene ether solution and the chelating agent aqueous solution at a temperature of from 50 to 120° C. for 10 to 180 minutes, wherein (b) a mixture remaining after the recovery of the polyphenylene ether, which contains the non-water-soluble polymerization solvent and water-soluble poor solvent, is brought into contact with water to extract the water-soluble poor solvent, and a water phase containing the thus extracted water-soluble poor solvent is recovered by separation, and wherein (c) the water-soluble poor solvent is separated and removed from the water phase by distillation, and the whole or a part of the remaining water phase is recycled as water to be brought into contact with the mixture, the remaining water phase having a content of a high-boiling-point organic substance of 1 wt. % or less.

2) The production process of a polyphenylene ether according to item 1) above, wherein the water-soluble poor solvent forms an azeotropic mixture not with water but with the non-water-soluble polymerization solvent and has a lower boiling point than that of water.

3) The production process of a polyphenylene ether according to items 1) or 2) above, wherein the water-soluble poor solvent is methanol.

4) The production process of a polyphenylene ether according to any one of items 1) to 3) above, wherein the non-water-soluble polymerization solvent is toluene.

5) The production process of a polyphenylene ether according to any one of items 1) to 4) above, wherein the content of a high-boiling-point organic substance in the remaining water phase to be recycled is 0.5 wt. % or less.

6) The production process of a polyphenylene ether according to any one of items 1) to 5) above, wherein the total amount of the polymerization solvent and the poor solvent contained in the remaining water phase to be recycled is 0.1 wt. % or less.

DETAILED DESCRIPTION OF THE INVENTION

Polyphenylene Ether

The polyphenylene ether for use in the invention is a homopolymer, random copolymer or block copolymer having a recurring unit represented by the following formula (1):

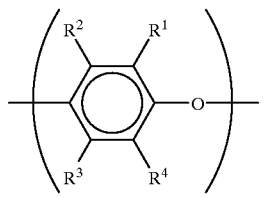

wherein $R^1$, $R^2$, $R^3$ and $R^4$ each independently represents hydrogen, an alkyl group, a substituted alkyl group, a halogen atom, a phenyl group or a substituted phenyl group.

Typical examples of the polyphenylene ether include homopolymers of poly(2,6-dimethyl-1,4-phenylene)ether, poly(2-methyl-6-ethyl-1,4-phenylene)ether, poly(2,6-diethyl-1,4-phenylene)ether, poly(2-ethyl-6-n-propyl-1,4-phenylene)ether, poly(2,6-di-n-propyl-1,4-phenylene)ether, poly(2-methyl-6-n-butyl-1,4-phenylene)ether, poly(2-ethyl-6-isopropyl-1,4-phenylene)ether, poly(2-methyl-6-chloroethyl-1,4-phenylene)ether or poly(2-methyl-6-hydroxyethyl-1,4-phenylene)ether; and also polyphenylene ether copolymers using, in combination therewith, 2,6-dimethylphenol and either one or both of 2,3,6-trimethylphenol and o-cresol as a copolymer component.

Oxidative Polymerization

As described, for example, in JP-B-42-3195 (The term "JP-B" used herein means an "examined Japanese patent publication"), JP-A-64-33131 (The term "JP-A" used herein means an "unexamined published Japanese patent application") or JP-B-61-8092, the polyphenylene ether of the invention is produced by oxidative coupling polymerization of a phenol compound in a uniform system in the presence of a complex catalyst which is a combination of a salt of a metal selected from a group consisting of copper, manganese and cobalt and an amine and is soluble in a polymerization solvent. Specific examples of the metal salt include cuprous chloride, cupric chloride, cuprous bromide, cupric bromide, cuprous sulfate, cupric sulfate, cuprous acetate, cupric acetate, cuprous propionate, cupric laurate, cuprous palmitate and cuprous benzoate; and similar manganese salts and cobalt salts. Instead of direct addition of the above-exemplified metal salt, it is also possible to add a metal or a metal oxide and an inorganic acid, organic acid or an aqueous solution of such an acid and form the corresponding metal salt or hydrate at the site as a component to be combined. Specific examples of the primary, secondary or tertiary amine include mono- and dimethylamine, mono- and diethylamine, mono- and dipropylamine, mono- and dibutylamine, mono- and dibenzylamine, mono- and dicyclohexylamine, mono- and diethanolamine, methylethylamine, methylpropylamine, methylcyclohexylamine, ethylisopropylamine, benzylmethylamine, octylchlorobenzylamine, methylphenethylamine, benzylethylamine and dimethylbutylamine. In addition, included are N,N'-dialkylethylenediamines such as N,N'-di-ter-butylethylenediamine, N,N'-di-ter-amylethylenediamine and N,N'-di-isopropylethylenediamine, N,N,N'-trialkylethylenediamines, N,N'-dialkylpropylenediamines and N,N,N'-trialkylpropylenediamines.

The non-water-soluble polymerization solvent must be a good solvent for a polyphenylene ether. Examples thereof include aromatic hydrocarbons such as benzene, toluene and xylene, halogenated hydrocarbons such as dichloromethane, chloroform and dichlorobenzene, and nitro compounds such as nitrobenzene. Also usable is a polymerization solvent obtained by mixing such a good solvent with a poor solvent for a polyphenylene ether, for example, an alcohol such as methanol or ethanol and/or aliphatic hydrocarbon such as hexane or heptane at any ratio within an extent not impairing the polymerization reaction of the polyphenylene ether. In the invention, the polymerization solvent must be non-water-soluble in consideration of the separability from an aqueous solution of a chelating agent which will be described later. Of the above-exemplified polymerization solvents, toluene which has low toxicity and a relatively low boiling point is preferred for less problems for environment and ease in the drying step.

Contact with an Aqueous Solution of a Chelating Agent

In the invention, a polyphenylene ether solution obtained by oxidative polymerization in a polymerization solvent is, after reaction, brought into contact with an aqueous solution of a chelating agent to convert the metal catalyst into the corresponding chelating compound, whereby the catalyst is deactivated and polymerization is terminated. Then, the solution is maintained at from 50 to 120° C. for 10 to 180 minutes, preferably at 60 to 100° C. for 30 to 150 minutes. Although this heating treatment may be conducted without separating the aqueous solution of a chelating agent, it is preferably conducted in an inert gas atmosphere by purging the oxygen remaining in the gas phase with nitrogen. It is also preferred that heating treatment is conducted before the polyphenylene ether is not precipitated as a solid after polymerization. This step not only makes it possible to effectively extract the metal catalyst, which has been used for polymerization, in the water phase but also can suppress the elution of a diphenoquinone by produced upon polymerization to the minimum. It is presumed that converting reaction to introduce almost all the amount of the by produced diphenoquinone in the main chain of the polymer occurs under the state not permitting extraction with the polymerization solvent. The existence of an amine used for polymerization is effective for such a converting reaction of the by-produced quinone so that use of the contact mixture after termination of the polymerization as it is rather preferred.

No particular limitation is imposed on the chelating agent to be used here insofar as it is a compound capable of forming a water-soluble complex with the metal in the catalyst used for polymerization. Examples include alkali metal salts of ethylenediaminetetraacetic acid and alkali metal salts of nitrilotriacetic acid. The chelating agent to be brought into contact with the polyphenylene ether solution is added in an amount sufficient to trap the whole amount of the metal in the catalyst formed as a complex. When the amount is less than the complex formation amount, the extraction of the catalyst metal from the polymerization reaction solution is insufficient, causing an inconvenience such as remaining of the catalyst metal in the product. Although no particular limitation is imposed on the concentration of the chelating agent, the concentration of the chelating agent exceeding its solubility is not preferred because its precipitation as a solid inevitably occurs.

The contact with the aqueous solution of a chelating agent can be carried out in the presence of a water-soluble reducing agent which is thought to be effective for suppressing the coloring of a polymer by a diphenoquinone. Examples of such a water-soluble reducing agent include dithionites of ammonium, lithium, sodium (hydrosulfite), potassium, rubidium, cesium, beryllium, magnesium, calcium, strontium, barium, zinc and cadmium; and similar thiosulfates.

Collection of a Polyphenylene Ether

After termination of polymerization and heating treatment, the solution of a polyphenylene ether in a polymerization solvent can easily be separated only by allowing it to stand, because it is not mixed with the aqueous solution of a chelating agent wherein the catalyst metal has been trapped. The polyphenylene ether solution after liquid—liquid separation by proper means is brought into contact with a poor solvent to precipitate the polyphenylene ether as a solid. Usable as a water-soluble poor solvent to be used for the precipitation of a polyphenylene ether in the invention is a solvent which forms an azeotropic mixture not with water but with the non-water-soluble polymerization solvent and at the same time has a lower boiling point than water when used singly. Examples include alcohols such as methanol and aliphatic ketones such as acetone. Of these, methanol is most preferred for its poorest solvent properties and good solubility in water. In some cases, the above-described polymerization solvent of a polyphenylene ether may exist in the poor solvent within an extent not impairing the precipitation of the polyphenylene ether.

The polyphenylene ether thus precipitated is subjected to solid-liquid separation from a mixture containing the polymerization solvent and poor solvent by continuous or batchwise treatment through a centrifugal separator or vacuum filtration. The polyphenylene ether thus recovered is then fed to a drying step, through which it is obtained as a product.

Extraction of a Poor Solvent with Water

The mixture containing the polymerization solvent and poor solvent, which mixture has been separated as a filtrate upon recovery of the precipitated polyphenylene ether, is fed to the recovery step for recycling.

In the invention, when the non-water-soluble polymerization solvent and water-soluble poor solvent form an azeotropic mixture, they cannot be separated easily by distillation. Accordingly, a mixture containing the polymerization solvent and poor solvent, which will otherwise form an azeotropic mixture, is brought into contact with water to extract the poor solvent in the water phase, thereby making it possible to liquid—liquid-separation from the polymerization solvent. Thus, distillation can be avoided. This extraction of the water-soluble poor solvent with water is conducted by using water in an amount of 0.5 to 2.0 times the weight of the poor solvent and contacting and mixing them at a temperature ranging from 0 to 100° C. for 1 to 60 minutes. If necessary, the polymerization solvent and/or poor solvent recycled from another step may be mixed in the above-described mixture containing the polymerization solvent and poor solvent. The water phase containing the thus-extracted water-soluble poor solvent is subjected to liquid—liquid separation from the non-water-soluble polymerization solvent by suitable means. The oil phase containing the separated polymerization solvent is fed to the recovery step for recycling.

Separation of Water Phase by Distillation

The water-soluble-poor-solvent-containing water phase thus recovered by separation is then separated into water and poor solvent by distillation. In the invention, since the poor solvent has a lower boiling point than water, the poor solvent is taken out from the top of a column, while water and water phase containing a small amount of high-boiling-point organic substances are taken out from the bottom of the column. The amine used as a polymerization catalyst is a distillate having an intermediate boiling point, it can be obtained as a side cut as needed. The water-soluble poor solvent thus recovered is fed to the precipitation step of a polyphenylene ether for recycled use, while the whole or part of the water phase thus recovered as a bottom solution is recycled as water to be brought into contact with the above-described mixture containing the polymerization solvent and poor solvent.

The content of the high-boiling-point organic substances in the water phase to be recycled must be suppressed to 1 wt. % or less, preferably 0.5 wt. % or less per weight of water. Contents of the high-boiling-point organic substances exceeding the upper limit cause precipitation of the high-boiling-point organic substances as a viscous liquid or solid upon distillation of the water phase and induce clogging of a pipe therewith, leading to difficulty in recycling operation. In the invention, the content of high-boiling-point organic substances in the water phase is determined in the following manner. Described specifically, 300 g of the water phase is weighed precisely as a sample and evaporated to dryness by heating to 110° C. under normal pressure in a nitrogen atmosphere. The solid thus obtained is added with 300 g of pure water, followed by through stirring at 70° C. The dissolved content is removed by filtration, while the remaining solid is dried for at least 8 hours by heating to 110° C. under normal pressure in a nitrogen atmosphere. The remaining solid content is weighed and a percentage of it to the precise weight is calculated as the content of high-boiling-point organic substances.

It is preferred to adjust, to the minimum, the total amount of the polymerization solvent and poor solvent contained in the water phase which is to be provided for recycled use. More specifically, the total amount not greater than 0.1 wt. % is desired. If it exceeds this upper limit, the water phase can be recycled without a problem, but treatment of drainage with active sludge requires excessively large equipment. Accordingly, when the content of high-boiling-point organic substances in the water phase to be recycled exceeds the upper limit, it is necessary to discharge a portion of the water phase to be recycled and compensate for it by the same amount of water. According to the invention, the discharged amount of water can be reduced largely compared with the case where no recycling is conducted so that the present process is markedly effective from the viewpoints of environmental protection and energy saving.

EXAMPLES

The present invention will be illustrated in greater detail with reference to the following Examples, but the invention should not be construed as being limited thereto.

Example 1

Polymerization

A catalyst solution was prepared by dissolving a mixed solution of 8.5 g of a 47% aqueous solution of hydrobromic acid and 1.4 g of cuprous oxide in a solution obtained by dissolving, in 2770 g of toluene, 3.4 g of N,N'-di-ter-butylethylenediamine, 41.9 g of N,N-dimethyl-n-butylamine, 16.5 g of N,N-di-n-butylamine and 1.0 g of trioctylmethylammonium chloride. In a reactor containing this catalyst solution, a solution obtained by dissolving 1100 g of 2,6-dimethylphenol in 1057 g of toluene was charged at a fixed rate over 20 minutes at 40° C. while feeding the reactor with air, thereby causing oxidative polymerization. Even after the charging of phenol is completed, reaction was continued for further 90 minutes.

Collection of Polymer

The reactor was then purged with nitrogen, followed by the addition of 500 g of an aqueous solution having 12.6 g of tetrasodium ethylenediaminetetraacetate dissolved therein. Stirring was continued at 70° C. for 2 hours. After completion of the stirring, the polymerization reaction mixture was separated from the aqueous solution of tetrasodium ethylenediaminetetraacetate. Under stirring, the polymerization reaction mixture was charged in twice the amount, based on the weight of toluene, of methanol, whereby a polyphenylene ether was obtained as a slurry. The resulting slurry was subjected to solid-liquid separation by vacuum filtration. Vacuum filtration was continued further while methanol, in the same amount as the polyphenylene ether cake, was sprinkled over the polyphenylene ether cake for rinsing and washing.

Recovery of Solvent

A mixture of the filtrate obtained by vacuum filtration of the slurry and the methanol used for rinsing and washing was mixed well at 40° C. with pure water in the same amount as methanol in the mixture, whereby methanol was extracted with water. The extract was then separated into an oil phase and a water phase by a centrifugal separator. The water phase thus separated was separated further into methanol and water under a nitrogen atmosphere by a distilling apparatus equipped with a reflux condenser.

Recycled Use of Water

Similar procedures (polymerization, recovery of polymer, recovery of solvents) except for use of the above-described water separated by distillation instead of pure water used for extraction of methanol in the above-described step of solvent recovery were repeated. The amount of high-boiling-point organic substances and the total amount of solvents (toluene and methanol), each contained in the water separated by distillation after recycling 0 time, 9 times and 14 times were measured and existence of the precipitate was visually observed. The results of measurement and observation are shown in Table 1.

TABLE 1

| Frequency of recycling | 0 | 9 | 14 |
|---|---|---|---|
| Content of high-boiling-point organic substances, wt. % | 0.05 | 0.49 | 0.72 |
| Total amount of solvents, wt. % | 0.07 | 0.06 | 0.08 |
| Precipitate | None | None | Observed, but a little |

Example 2

Procedures (polymerization, recovery of polymer, recovery of solvents, recycled use of water) similar to Example 1 except that 2.3 g of hydrosulfite was dissolved in 500 g of an aqueous solution having 12.6 g of tetrasodium ethylenediaminetetraacetate dissolved therein were repeated. The amount of high-boiling-point organic substances and the total amount of the solvents (toluene and methanol), each in the water separated by distillation after recycling 0 time, 2 times and 4 times were measured and existence of the precipitate was visually observed. The results of measurement and observation are shown in Table 2.

TABLE 2

| Frequency of recycling | 0 | 2 | 4 |
|---|---|---|---|
| Content of high-boiling-point organic substances, wt. % | 0.21 | 0.43 | 0.79 |
| Total amount of solvents, wt. % | 0.02 | 0.04 | 0.06 |
| Precipitate | None | None | Observed, but a little |

Example 3

Procedures (polymerization, recovery of polymer, recovery of solvents, recycled use of water) similar to Example 1 except that a solution obtained by dissolving 10.3 g of cupric bromide and 187 g of N,N-di-n-butylamine in 2770 g of toluene was used as a catalyst solution for polymerization were repeated. The amount of high-boiling-point organic substances and the total amount of solvents (toluene and methanol), each in the water separated by distillation after recycling 0 time, 9 times and 14 times were measured and existence of the precipitate was visually observed. The results of measurement and observation are shown in Table 3.

TABLE 3

| Frequency of recycling | 0 | 9 | 14 |
|---|---|---|---|
| Content of high-boiling-point organic substances, wt. % | 0.06 | 0.51 | 0.75 |
| Total amount of solvents, wt. % | 0.08 | 0.07 | 0.09 |
| Precipitate | None | None | Observed, but a little |

Comparative Example 1

In a similar manner to Example 1 except that upon recovery of the polymer, stirring was conducted at 40° C. for 2 hours instead of stirring at 70° C. for 2 hours, water was separated by distillation. The amount of high-boiling-point organic substances and the total amount of solvents (toluene and methanol) in the water separated by distillation were measured and existence of the precipitate was visually observed. The results of measurement and observation are shown in Table 4.

TABLE 4

| Frequency of recycling | 0 |
|---|---|
| Content of high-boiling-point organic substances, wt. % | 1.3 |
| Total amount of solvents, wt. % | 0.07 |
| Precipitate | Observed (impossible to provide for recycled use) |

The process of the invention makes it possible to reduce the discharged amount of water generated upon production of a polyphenylene ether by recycling use of it as water for the polymerization-solvent-recovery step.

While the invention has been described in detail and with reference to specific examples thereof, it will be apparent to one skilled in the art that various changes and modifications can be made therein without departing from the spirit and scope thereof.

What is claimed is:

1. A process for producing a polyphenylene ether, which comprises:

contacting, with an aqueous solution of a chelating agent, a polyphenylene ether solution obtained by polymerization in a non-water-soluble polymerization solvent for a polyphenylene ether in the presence of a catalyst, to terminate the polymerization and deactivating the catalyst; and adding a water-soluble poor solvent for the polyphenylene ether to precipitate the polyphenylene ether; and recovering the thus precipitated polyphenylene ether, wherein (a) the contact with the chelating agent aqueous solution is carried out by holding the polyphenylene ether solution and the chelating agent aqueous solution at a temperature of from 50 to 120° C. for 10 to 180 minutes, wherein (b) a mixture remaining after the recovery of the polyphenylene ether, which contains the non-water-soluble polymerization solvent and water-soluble poor solvent, is brought into contact with water to extract the water-soluble poor solvent, and a water phase containing the thus extracted water-soluble poor solvent is recovered by separation, and wherein (c) the water-soluble poor solvent is separated and removed from the water phase by distillation, and the whole or a part of the remaining water phase is recycled as water to be brought into contact with the mixture, the remaining water phase having a content of a high-boiling-point organic substance of 1 wt. % or less.

2. The production process of a polyphenylene ether according to claim 1, wherein the water-soluble poor solvent forms an azeotropic mixture not with water but with the non-water-soluble polymerization solvent and has a lower boiling point than that of water.

3. The production process of a polyphenylene ether according to claim 1 or 2, wherein the water-soluble poor solvent is methanol.

4. The production process of a polyphenylene ether according to claim 1 or 2, wherein the non-water-soluble polymerization solvent is toluene.

5. The production process of a polyphenylene ether according to claim 1 or 2, wherein the content of a high-boiling-point organic substance in the remaining water phase to be recycled is 0.5 wt. % or less.

6. The production process of a polyphenylene ether according to claim 1 or 2, wherein the total amount of the polymerization solvent and the poor solvent contained in the remaining water phase to be recycled is 0.1 wt. % or less.

7. The production process of a polyphenylene ether according to claim 1, wherein the polyphenylene ether is:

(A) a homopolymer which is at least one selected from the group consisting of poly(2,6-dimethyl-1,4-phenylene) ether, poly(2-methyl-6-ethyl-1,4-phenylene)ether, poly(2,6-diethyl-1,4-phenylene)ether, poly(2-ethyl-6-n-propyl-1,4-phenylene)ether, poly(2,6-di-n-propyl-1,4-phenylene)ether, poly(2-methyl-6-n-butyl-1,4-phenylene)ether, poly(2-ethyl-6-isopropyl-1,4-phenylene)ether, poly(2-methyl-6-chloroethyl-1,4-phenylene)ether and poly(2-methyl-6-hydroxyethyl-1,4-phenylene)ether;

(B) a copolymer wherein the polyphenylene ether (A) comprises 2,6-dimethylphenol and either one or both of 2,3,6-trimethyl-phenol and o-cresol as a comonomer component; or (C) a mixture of (A) and (B).

8. The production process of a polyphenylene ether according to claim 1, wherein the catalyst is at least one salt of a metal selected from the group consisting of copper, manganese and cobalt in combination with an amine.

9. The production process of the polyphenylene ether according to claim 8, wherein the metal salt is at least one selected from the group consisting of cuprous chloride, cupric chloride, cuprous bromide, cupric bromide, cuprous sulfate, cupric sulfate, cuprous acetate, cupric acetate, cuprous propionate, cupric laurate, cuprous palmitate, cuprous benzoate, manganese chloride, manganese bromide, manganese sulfate, manganese acetate, manganese propionate, manganese laurate, manganese palmitate, manganese benzoate, cobalt chloride, cobalt bromide, cobalt sulfate, cobalt acetate, cobalt propionate, cobalt laurate, cobalt palmitate and cobalt benzoate.

10. The production process of a polyphenylene ether according to claim 8, wherein the amine is at least one selected from the group consisting of mono- and dimethylamine, mono- and diethylamine, mono- and dipropylamine, mono- and dibutylamine, mono- and dibenzylamine, mono- and dicyclohexylamine, mono- and diethanolamine, methylethylamine, methylpropylamine, methylcyclohexylamine, ethylisopropylamine, benzylmethylamine, octylchlorobenzylamine, methylphenethylamine, benzylethylamine, dimethylbutylamine, and N,N'-dialkylethylenediamine.

11. The production process of a polyphenylene ether according to claim 1, wherein the contact with the chelating agent aqueous solution is carried out by holding the polyphenylene ether solution and the chelating agent aqueous solution at a temperature of from 60 to 100° C. for 30 to 150 minutes.

12. The production process of a polyphenylene ether according to claim 1, wherein the chelating agent is at least one selected from the group consisting of alkali metal salts of ethylenediaminetetraacetic acid and alkali metal salts of nitrilotriacetic acid, and wherein the chelating agent is brought into contact with the polyphenylene ether solution in an amount sufficient to trap the whole amount of the metal in the catalyst formed as a complex.

13. The production process of a polyphenylene ether according to claim 1, wherein the contact with the chelating agent aqueous solution is carried out in the presence of at least one water-soluble reducing agent selected from the group consisting of ammonium dithionite, lithium dithionite, sodium dithionite, potassium dithionite, rubidium dithionite, cesium dithionite, beryllium dithionite, magnesium dithionite, calcium dithionite, strontium dithionite, barium dithionite, zinc dithionite, cadmium dithionite, ammonium thiosulfate, lithium thiosulfate, sodium thiosulfate, potassium thiosulfate, rubidium thiosulfate, cesium thiosulfate, beryllium thiosulfate, magnesium thiosulfate, calcium thiosulfate, strontium thiosulfate, barium thiosulfate, zinc thiosulfate and cadmium thiosulfate.

* * * * *